United States Patent Office 3,311,453
Patented Mar. 28, 1967

3,311,453
MANUFACTURE OF HYDROGEN PEROXIDE
George Russell Lusby, St. Hilaire Station, Quebec, Canada, assignor to Canadian Industries Limited, Quebec, Quebec, Canada, a corporation of Canada
No Drawing. Filed Oct. 7, 1963, Ser. No. 314,482
Claims priority, application Canada, Oct. 27, 1962, 861,129
8 Claims. (Cl. 23—207)

This invention relates to a novel process for the manufacture of hydrogen peroxide.

Hydrogen sulphide is produced extensively as a by-product from natural gas and petroleum and it is known to produce sulphur therefrom by oxidation. It has now been found that hydrogen sulphide can be used as a raw material for the production of hydrogen peroxide.

It is therefore an object of this invention to provide a new process for the manufacture of hydrogen peroxide. Another object is to provide such a process using hydrogen sulphide as raw material. Additional objects will appear hereinafter.

Broadly speaking, the process of this invention comprises reacting an hydrogen sulphide gas with an alkaline aqueous solution of a salt of an anthraquinone disulphonic acid, thus producing elemental sulphur and the reduced anthraquinone disulphonic acid salt, separating the sulphur and oxidizing said reduced salt to form hydrogen peroxide, thereby regenerating the starting anthraquinone disulphonic acid salt. The latter salt can thus be used repeatedly for the production of hydrogen peroxide.

The hydrogen sulphide gas suitable for the process of this invention may be pure hydrogen sulphide or it may be a gas containing hydrogen sulphide and a gaseous hydrocarbon. However, the presence of oxygen in the hydrogen sulphide-containing gas will decrease the yield of hydrogen peroxide.

The anthraquinone disulphonates suitable as reactants in the process of this invention include the sodium salts of the known isomers of anthraquinone disulphonic acid and mixtures thereof. The disodium salt of anthraquinone 2,7-disulphonic acid is the most water-soluble of the isomeric sodium salts and, being commercially available, is the preferred reagent. However, the less soluble salts of the other isomers of anthraquinone disulphonic acid can be used at lower concentrations but the yield of hydrogen peroxide will be less than when the 2,7-disulphonic acid derivative is employed.

In the preferred embodiment of the invention, an aqueous solution containing from 10 to 150 grams per litre of disodium anthraquinone 2,7-disulphonate, about 10 grams per litre of boric acid and sufficient sodium hydroxide to bring the solution to a pH about 9 is employed. The hydrogen sulphide gas is introduced into this solution by a dispersing device and the reacting mixture is agitated, the reaction producing elemental sulphur and the reduced anthraquinone disulphonate. The excess hydrogen sulphide is removed by passing carbon dioxide through the reaction mixture and the sulphur is separated from the reduced anthraquinone derivative by filtration. The reduced anthraquinone derivative is then regenerated by aerating the solution after addition of lime thereto.

It has been found that better yields of hydrogen peroxide are obtained when lime is added to the reduced solution at the beginning of the oxidation stage.

The precipitate of calcium peroxide is separated by filtration and the hydrogen peroxide recovered by the known decomposition of calcium peroxide with carbon dioxide. The regenerated disodium anthraquinone 2,7-disulphonate can then be again reduced with hydrogen sulphide and the cycle repeated.

In addition to producing hydrogen peroxide, the process of this invention can be modified to produce oxygen. Instead of isolating the hydrogen peroxide formed by the oxidation of the reduced anthraquinone derivative, the solution containing the hydrogen peroxide is passed over a hydrogen peroxide decomposition catalyst such as ferric oxide, manganese dioxide, silver or copper. The oxygen liberated is then separated from the aqueous solution and dried.

The process of this invention is more fully illustrated by the following examples but it is to be understood that its scope is not limited to the specific embodiments therein described.

Example I 3.5 litres of a solution containing 100 grams per litre of disodium anthraquinone 2,7-disulphonate, 10 grams per litre of boric acid and sufficient sodium hydroxide to give a pH of about 9 was stirred by a single blade impeller, the temperature being maintained at 25° C. A stream of 100% hydrogen sulphide gas was passed into this solution through a gas disperser located below the stirrer. Precipitation of sulphur commenced about 7 to 8 minutes after the start of the introduction of hydrogen sulphide. At the end of 3½ hours, the flow of hydrogen sulphide was stopped and carbon dioxide gas was passed through the solution for 2 hours to remove excess hydrogen sulphide. The resulting mixture was filtered and 19.5 grams of crystalline sulphur were collected, corresponding to a 71.8% yield, based on the quinone content of the solution. 69 grams of calcium hydroxide representing about a 10% excess over that required for a stoichiometric yield of hydrogen peroxide were added to the filtrate which was then aerated. The precipitate was filtered off and analyzed for available oxygen. A precipitate containing 19.7 grams of calcium peroxide was recovered. This corresponded to a 32.2% yield of hydrogen peroxide based on the quinone content of the solution and a 45% yield based on the sulphur produced. The remainder of the solid precipitate consisted mainly of slime and some calcium carbonate. The calcium peroxide precipitate produced was slimy in nature and very slow to filter. During the operation the evolution of gas, believed to be oxygen, from the slurry was observed.

Example II

The procedure of Example I was repeated and 21.5 grams of sulphur were collected giving a sulphur yield of 78% based on the quinone content of the solution. Several 100 ml. aliquots of the reduced anthraquinone solution were aerated in the presence of various proportions of lime. When a stoichiometric quantity of lime was used, a precipitate containing 50% calcium peroxide based on dried precipitate was formed. This corresponded to a 53.8% yield of hydrogen peroxide based on the quinone content of the solution and 68.6% based on the sulphur produced. A 50% excess of lime over stoichiometric requirements gave a hydrogen peroxide yield of 55% based on quinone content of the solution and 70.1% based on the sulphur produced.

The remainder of the reduced solution was treated with 20 grams of lime to remove carbon dioxide. 1 litre of this slurry was filtered and 6.0 grams of calcium hydroxide were added to it. This represented only about two thirds of the lime required to precipitate as calcium peroxide the hydrogen peroxide formed during the subsequent aeration. This slurry was aerated and filtered off. Analysis of the wet precitpitate showed that 93.8% of the calcium had been converted to calcium peroxide. The precipitate however was very slimy and could not be easily washed and had absorbed in it an appreciable amount of quinone.

Example III

This example illustrates a modification of the process whereby the hydrogen peroxide product is decomposed to oxygen.

A reaction vessel consisting of a conical flask connected by a capillary tube to a gas collecting vessel was employed. The peroxide-containing solution was placed in the conical flask, the gas collecting vessel and connecting capillary tubing being filled with water. There was a space above the liquid in the conical flask of about 20 mls. which contained air.

To 270 mils. of a regenerated solution of the disodium salt of anthraquinone 2,7-disulphonic acid containing 3.02 g. per litre of hydrogen peroxide and placed in the above reaction vessel connected to the gas collecting vessel, there were added 10 mg. of manganese dioxide and 20 mg. of ferric oxide. The evolved gas was collected by displacement of water and analyzed by gas chromatography. The experiment was repeated employing 470 mls. of the same hydrogen peroxide containing solution but employing a larger reaction vessel.

The results are shown in the following table.

TABLE

| Volume of Solution, mls. | Time of Gas Evolution hours | Volume of Gas Collected, mls., 25° C. | Gas Composition by Volume | | Oxygen Collected, mls. | Oxygen Yield, Percent |
| --- | --- | --- | --- | --- | --- | --- |
| | | | Nitrogen, Percent | Oxygen, Percent | | |
| 270 | 4 | 360 | 19.2 | 80.8 | 274 | 93.5 |
| 470 | 3.5-4 | 560 | 8.8 | 91.2 | 497 | 97.1 |

Some leakage of air into the apparatus occurred during the experiments.

Example IV 100 mls. of a solution containing 10 grams per litre of disodium anthraquinone-2,7-disulphonate, 0.55 grams per litre of boric acid and sufficient sodium hydroxide to give a pH of 9 were stirred by a magnetic bar stirrer at a temperature maintained at 25° C. A stream of a 100% hydrogen sulphide gas was passed into the solution through a gas disperser. Sulphur precipitation began about 2 minutes after the start of the hydrogen sulphide. At the end of 30 minutes, the hydrogen sulphide was stopped, and carbon dioxide was then passed through the solution for 60 minutes to remove excess hydrogen sulphide. The resulting mixture was filtered and 74 mg. of sulphur was collected corresponding to a 95.0% yield based on the quinone content of the solution. 0.4 gram of calcium hydroxide was added to the filtrate which was then aerated. A precipitate containing 0.11 gram of calcium peroxide was obtained, corresponding to a 62.8% hydrogen peroxide yield based on the quinone content of the solution and 66.2% based on the sulphur produced.

Example V

The experiment of Example IV was repeated using 100 mls. of a solution containing 50 grams per litre of disodium anthraquinone-2,7-disulphonate, 5 grams litre of boric acid and sufficient sodium hydroxide to give a pH of 9.0. 0.369 gram of sulphur was obtained corresponding to a 95.0% yield based on the quinone content of the solution. 1.2 grams of calcium hydroxide were added to the filtrate which on aeration gave a precipitate containing 0.41 gram of calcium peroxide. This corresponded to a 47.0% peroxide yield based on the quinone content of the solution and 49.5% based on the sulphur produced.

Example VI

A stirred solution containing 150 grams per litre of disodium anthraquinone-2,7-disulphonate, 10 grams per litre of boric acid and sodium hydroxide to give a pH of 9.0 was maintained at 60° C. and treated with a 100% hydrogen sulphide gas for 60 minutes in the afore-mentioned manner. At the end of this time, the hydrogen sulphide was stopped and the solution then purged with carbon dioxide to remove excess hydrogen sulphide. 0.892 gram of sulphur was removed by filtration giving a yield of 76.3% based on the quinone content of the solution. The filtrate was cooled to about 40° C. and aerated in the presence of 4.0 grams of calcium hydroxide. The resulting precipitate was analysed and found to contain 0.839 gram of calcium peroxide. This corresponded to a peroxide yield of 32.0% based on the quinone content of the solution, and 42.0% based on the sulphur produced.

Example VII

A gas composed of 15% hydrogen sulphide and 85% methane (by volume) was passed for 60 min. into 150 mls. of a stirred solution of identical composition to that used in Examples I and II, maintained at 25° C. The excess hydrogen sulphide was removed by purging the solution with carbon dioxide for 60 minutes. 0.921 gram of sulphur was obtained by filtration corresponding to a 79.1% yield based on the quinone content of the solution. The filtrate was aerated in the presence of 2.0 grams of calcium hydroxide. The resulting precipitate was filtered and found to contain 0.862 gram of calcium peroxide, giving a peroxide yield of 32.8% based on the quinone content of the solution and 41.4% based on the sulphur produced.

Example VIII 200 mls. of a solution containing 30 grams per litre of disodium anthraquinone-2,6-disulphonate, 10 grams per litre of boric acid and sufficient sodium hydroxide to give a pH of 9.0, was heated to 60° C. The solution was stirred and a 100% hydrogen sulphide gas was passed through it for 1½ hours, the temperature dropping to about 25° C. at the end of this time. Excess hydrogen sulphide was removed by purging the solution with carbon dioxide. 0.421 gram of sulphur was produced corresponding to a 90.6% yield based on the quinone content of the solution. The filtrate was aerated in the presence of 2.0 grams of calcium hydroxide. 0.288 gram of calcium peroxide was produced, corresponding to a 27.5% peroxide yield based on the quinone content of the solution, and 30.3% based on the sulphur produced.

What I claim is:

1. A process for the manufacture of hydrogen peroxide which comprises reacting a hydrogen sulphide-containing gas with a salt of an anthraquinone disulphonic acid in alkaline aqueous solution, thus producing insoluble elemental sulphur and a soluble reduced anthraquinone disulphonic acid salt, separating the sulphur from the reaction mixture, oxidizing said reduced salt to form hydrogen peroxide and the regenerated salt of the anthraquinone disulphonic acid, and separating the hydrogen peroxide from the reaction mixture.

2. A process as claimed in claim 1 wherein the residual hydrogen sulphide is removed from the reaction mixture prior to oxidation of the reduced anthraquinone disulphonic acid salt.

3. A process as claimed in claim 1 wherein the alkaline aqueous solution of a salt of an anthraquinone disulphonic acid contains about 10 grams per litre of boric acid and sufficient sodium hydroxide to bring the solution to a pH of about 9.

4. A process as claimed in claim 1 wherein the hydrogen peroxide is separated from the reaction mixture by adding calcium hydroxide thereto, thus precipitating calcium peroxide, separating the calcium peroxide from the reaction mixture and regenerating hydrogen peroxide therefrom.

5. A process as claimed in claim 1 wherein the salt of an anthraquinone disulphonic acid is a member selected from the group consisting of disodium anthraquinone-2, 7 - disulphonate and disodium anthraquinone - 2,6 - disulphonate.

6. A process as claimed in claim 1 wherein the alkaline aqueous solution of a salt of an anthraquinone disulphonic acid contains from 10 to 150 grams per litre of said salt.

7. A process for the manufacture of oxygen which comprises contacting an hydrogen sulphide-containing gas with an aqueous solution containing from 10 to 150 grams per litre of a salt of an anthraquinone disulphonic acid, about 10 grams per litre of boric acid and sufficient sodium hydroxide to bring the solution to a pH of about 9, thus producing elemental sulphur and the reduced anthraquinone disulphonic acid salt, removing residual hydrogen sulphide from the reaction mixture, separating said sulphur, oxidizing the reduced anthraquinone disulphonic acid salt, contacting the resultant solution containing hydrogen peroxide with a hydrogen peroxide decomposition catalyst and separating the oxygen produced.

8. A process as claimed in claim 7 wherein the hydrogen peroxide decomposition catalyst is a mixture of manganese dioxide and ferric oxide.

References Cited by the Examiner

UNITED STATES PATENTS

| 2,479,111 | 8/1949 | Harris | 23—207 |
| 2,614,907 | 10/1952 | Cook | 23—207 |
| 2,734,798 | 2/1956 | Kamlet | 23—207 |
| 3,107,151 | 10/1963 | Hauschild | 23—207 |

FOREIGN PATENTS 803,121  10/1958  Great Britain.

OSCAR R. VERTIZ, *Primary Examiner.*

H. S. MILLER, *Assistant Examiner.*